(12) United States Patent
Gretz

(10) Patent No.: US 12,085,105 B1
(45) Date of Patent: Sep. 10, 2024

(54) ADJUSTABLE FLOOR HOLE COVER

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 546 days.

(21) Appl. No.: 17/317,484

(22) Filed: May 11, 2021

Related U.S. Application Data

(60) Provisional application No. 63/024,154, filed on May 13, 2020.

(51) Int. Cl.
*F16B 21/08* (2006.01)
*E04G 21/32* (2006.01)
*E04G 23/02* (2006.01)

(52) U.S. Cl.
CPC ............ *F16B 21/086* (2013.01); *E04G 21/32* (2013.01); *E04G 23/0203* (2013.01)

(58) Field of Classification Search
CPC ............... F16B 21/086; E04G 23/0285; E04G 23/0203; E04G 15/04; E04G 23/0288; E04G 21/32; E04C 2/52; E04B 5/16
See application file for complete search history.

(56) References Cited

U.S. PATENT DOCUMENTS

| | | | |
|---|---|---|---|
| 2,552,917 A | 11/1948 | Becker | |
| 5,845,442 A | 12/1998 | Strehlow | |
| 6,453,603 B1 | 9/2002 | Baker | |
| 8,572,913 B2 * | 11/2013 | Stubblefield | E04G 23/0203 52/220.8 |
| 9,366,044 B2 | 6/2016 | Gray et al. | |
| 9,410,335 B2 * | 8/2016 | Stubblefield | E04G 23/0285 |
| 9,695,607 B2 * | 7/2017 | Stubblefield | E04G 23/0285 |
| 10,094,128 B2 | 10/2018 | Hartman | |
| 10,505,350 B2 | 12/2019 | LeVey | |
| 10,640,996 B2 | 10/2020 | Hartman | |
| 11,255,067 B2 * | 2/2022 | Millman | E02D 29/1427 |
| 2003/0154664 A1 * | 8/2003 | Beck | E04D 15/025 52/784.1 |
| 2008/0075532 A1 * | 3/2008 | Boyd | E02D 17/10 404/25 |
| 2009/0282751 A1 * | 11/2009 | Orfield | B29C 48/0022 83/13 |
| 2009/0320391 A1 * | 12/2009 | Stubblefield | E04G 23/0285 277/369 |
| 2014/0298738 A1 * | 10/2014 | Stubblefield | E04G 23/0285 52/220.8 |
| 2017/0002577 A1 * | 1/2017 | Stubblefield | E04C 2/52 |
| 2020/0370266 A1 * | 11/2020 | Millman | E02D 17/10 |

* cited by examiner

*Primary Examiner* — Rodney Mintz

(57) ABSTRACT

An adjustable hole cover including an underside with one or more channels extending radially from the center of the cover to the outer edge. A row of apertures extends from the upper side into each of the channels. Retaining clips in each of the channels allow for adjustment of the cover to fit a wide range of hole sizes. The retaining clips include a base leg for sliding engagement with a channel and a second leg substantially orthogonal to the base leg. The base leg may be secured into one of the cover apertures to secure the retaining clip to the cover. Orientation of the retaining clip within the channel may be reversed to fit the cover to holes of a wide range of sizes. A reference scale on the underside of the cover allows for precise sizing to fit the hole diameter.

12 Claims, 8 Drawing Sheets

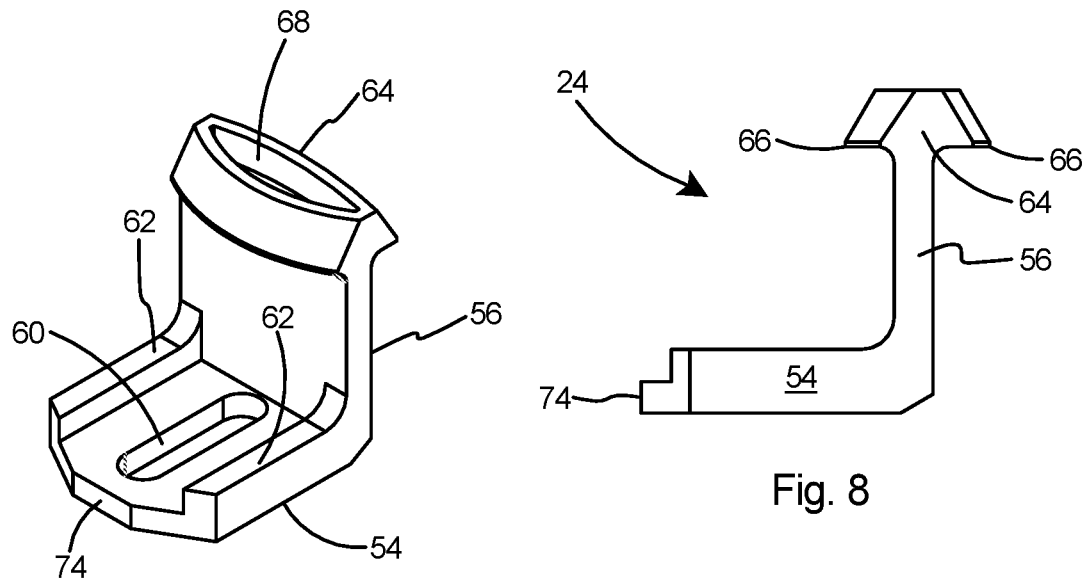
Fig. 6
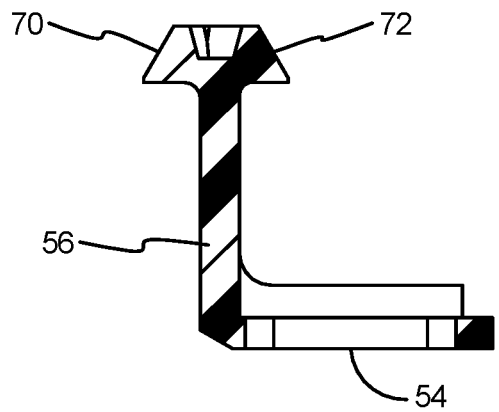
Fig. 8
Fig. 9
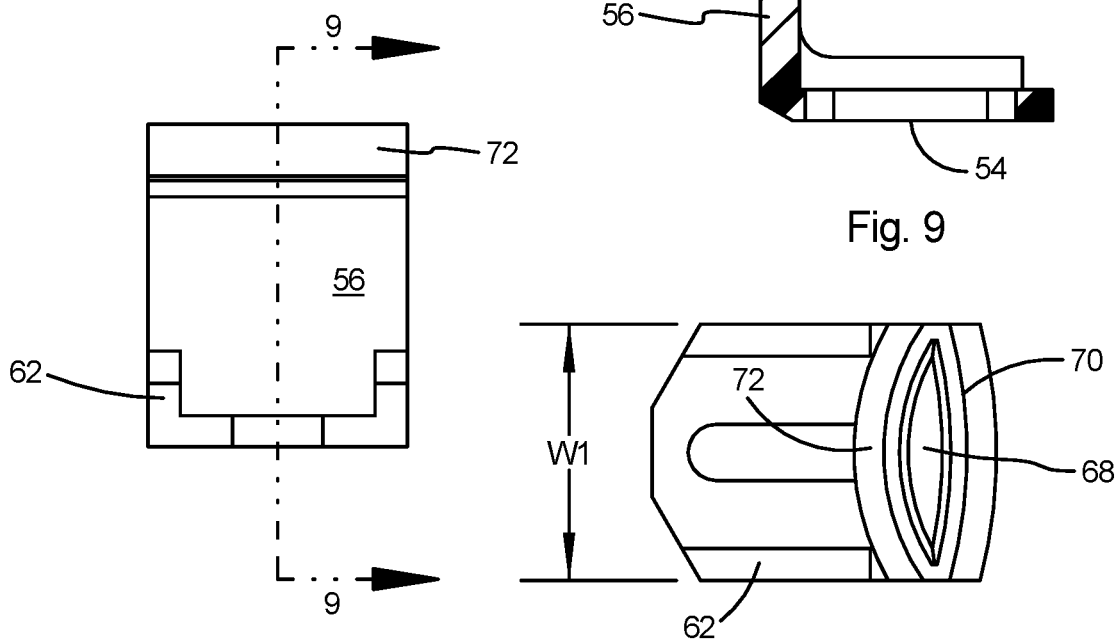
Fig. 7
Fig. 10

ADJUSTABLE FLOOR HOLE COVER

CROSS-REFERENCE TO RELATED APPLICATIONS

This application claims the benefit of Provisional U.S. Patent Application Ser. No. 63/024,154 filed May 13, 2020, the contents of which are incorporated herein by reference in their entirety.

FIELD OF THE INVENTION

The present invention generally relates to hole covers, and more specifically, to a hole cover that is adjustable to fit a wide range of hole sizes.

BACKGROUND OF THE INVENTION

According to OSHA safety standards, 29 CFR § 1910.23 specifies that floor openings and holes should be guarded by either a standard railing or a floor hole cover of standard strength and construction. Thus, in those situations in which it is impractical or undesirable to install a railing, a floor hole cover typically is installed to prevent the hole from becoming a tripping hazard.

Unfortunately, floor openings are typically of various diameters, thereby requiring manufacturers to stock and contractors to keep several cover sizes on hand. Although several covers for floor openings have been proposed, they are typically limited to fitting one diameter of hole or to fitting a limited range of hole sizes.

Although various devices have been proposed for covering a hole, few of them provide for an adjustable mechanism for accommodating holes of various sizes. Additionally, the complexity of the devices renders their manufacturing cost prohibitively expensive for many applications.

Accordingly, it would be advantageous to provide a floor hole cover that can be economically produced and which is adaptable to fitting a wide range of hole diameters.

BRIEF SUMMARY OF THE INVENTION

The current invention is an adjustable hole cover that includes a convex upper side and one or more channels extending radially from the center of the cover to the outer edge. A row of cover apertures centered with respect to each of the channels extends from the upper side into the channels. A retaining clip residing in each of the channels allows for adjustment of the cover to fit a wide range of hole sizes. The retaining clips include a base leg for sliding engagement with a channel and a second leg substantially orthogonal to the base leg. A slot in the base leg may be engaged by a screw and tightened into one of the cover apertures to secure the retaining clip to the cover. The second leg includes a wide end portion that terminates in a double barb. Orientation of the retaining clip within the channel may be reversed to fit the cover to either a small or large diameter hole. A reference scale on the underside of the cover plate allows for precise sizing to fit the hole diameter.

OBJECTS AND ADVANTAGES

A first object of the invention is to provide an adjustable hole cover that allows for adjustment to fit a range of hole sizes.

A further object is to provide an adjustable hole cover that includes a reference scale on the underside of the cover to allow for precise sizing to fit the hole diameter.

Another object is to provide the adjustable hole cover with a convex upper side to reduce trip hazard and enable easy travel of wheeled objects thereover.

A further object is to provide an adjustable hole cover for which screws are inserted from the underside of the cover and do not project from the upper surface.

Another object is to provide the adjustable hole cover with sliding retaining clips for retaining the cover in a hole.

A further object is to provide the adjustable hole cover with channels and retaining clips that are reversible within the channels in order to enable the hole cover to fit a wide range of hole sizes.

A yet further object is to provide a structure for maintaining the position and orientation of the retaining clips as they are slid into the proper position on the cover, the structure including providing one or more two-legged retaining clips and one or more channels on the underside of the cover for receiving the retaining clips.

A further object is to reduce manufacturing costs by providing material-saving recesses on the underside of the cover.

These and further objects and advantages will become clear when reading the detailed description along with reference to the associated drawings.

BRIEF DESCRIPTION OF THE SEVERAL VIEWS OF THE DRAWING(S)

Reference is made herein to the accompanying drawings, which are not necessarily drawn to scale, and wherein:

FIG. 6 is a perspective view of a retaining clip that forms a portion of the adjustable hole cover of FIG. 1.

FIG. 7 is a side view of the retaining clip.

FIG. 8 is a plan view of the retaining clip.

FIG. 9 is a sectional view of the retaining clip taken along line 9-9 of FIG. 7.

FIG. 10 is a top view of the retaining clip.

DETAILED DESCRIPTION

Figure 1:
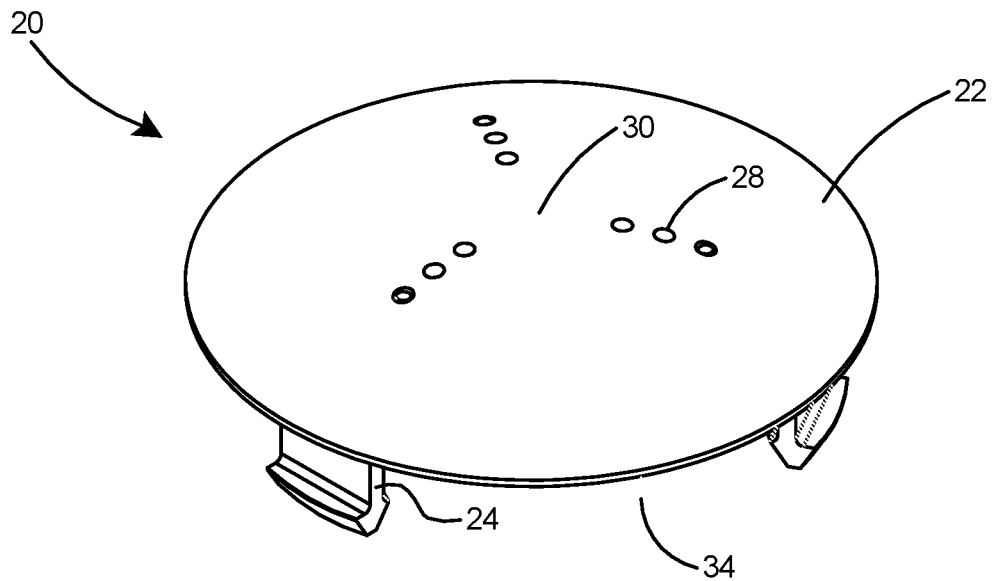
FIG. 1 is a top isometric view of a first embodiment of an adjustable hole cover assembly in accordance with embodiments of the invention.
Figure 2:
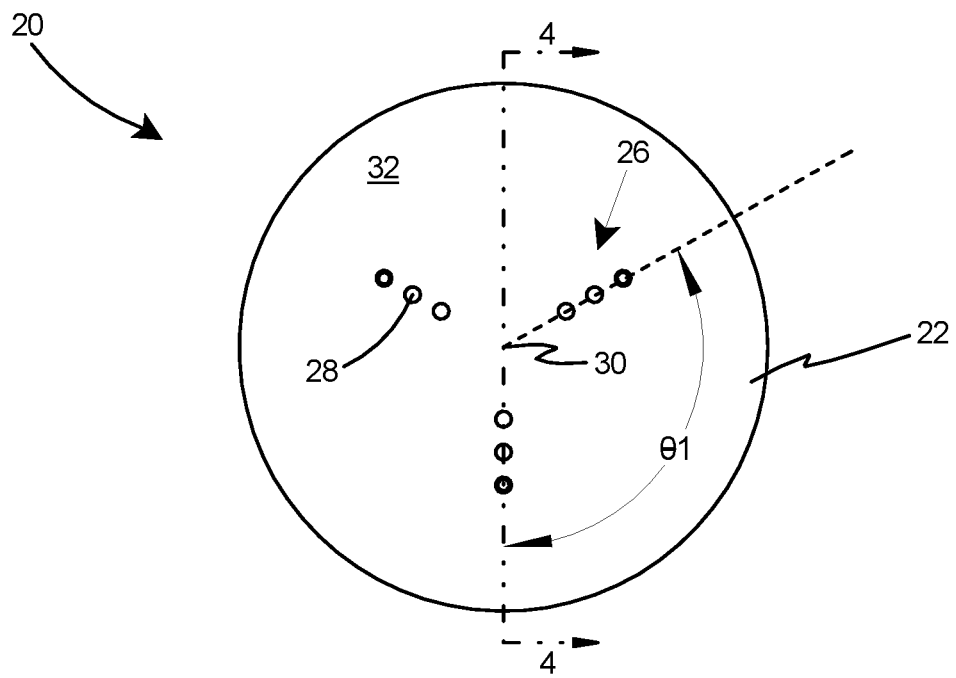
FIG. 2 is a top plan view of the adjustable hole cover.

With reference to FIGS. 1 and 2, the present invention is an adjustable hole cover 20 for covering a hole in a floor, wall, or similar structure. The adjustable cover 20 includes a cover plate 22 and one or more retaining clips 24 that are adjustable in order to fit holes of various sizes. A plurality of rows 26 of apertures 28 extend radially from the center 30 of the cover plate 22. Most preferably, the rows 26 are preferably aligned at an angle θ1 of 60 degrees apart with respect to one another.

Figure 3:
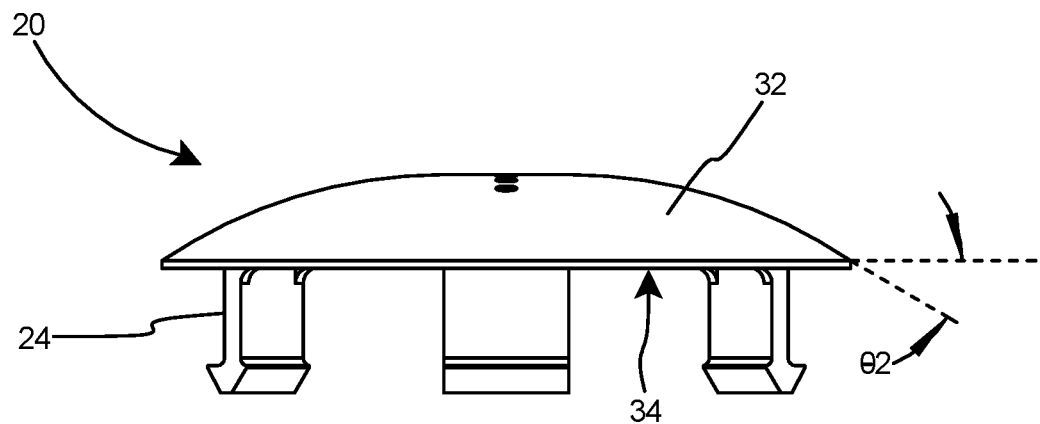
FIG. 3 is a side view of the adjustable hole cover.
Figure 4:
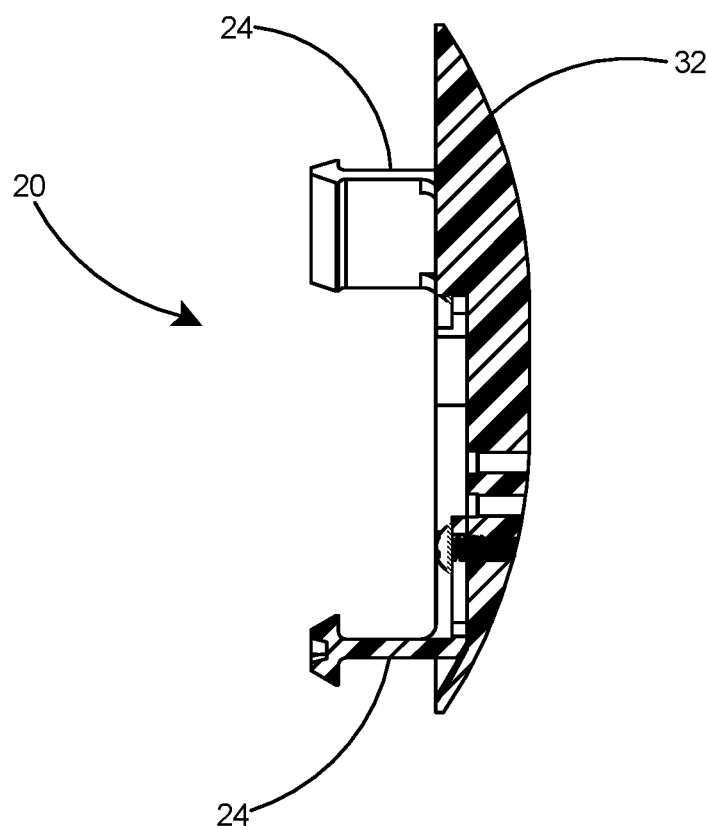
FIG. 4 is a sectional view of the adjustable hole cover taken along line 4-4 of FIG. 2.

Referring to FIGS. 3 and 4, the adjustable hole cover 20 includes a gently contoured top surface 32 and an outer circumference 34. The top surface 32 at the edge is preferably chamfered around the periphery of the cover plate 22 to an angle θ2 with respect to the outer circumference 34. Angle θ2 is preferably 30 degrees or less to enable wheeled vehicles such as suitcases and cars to easily pass over the cover.

Figure 5:
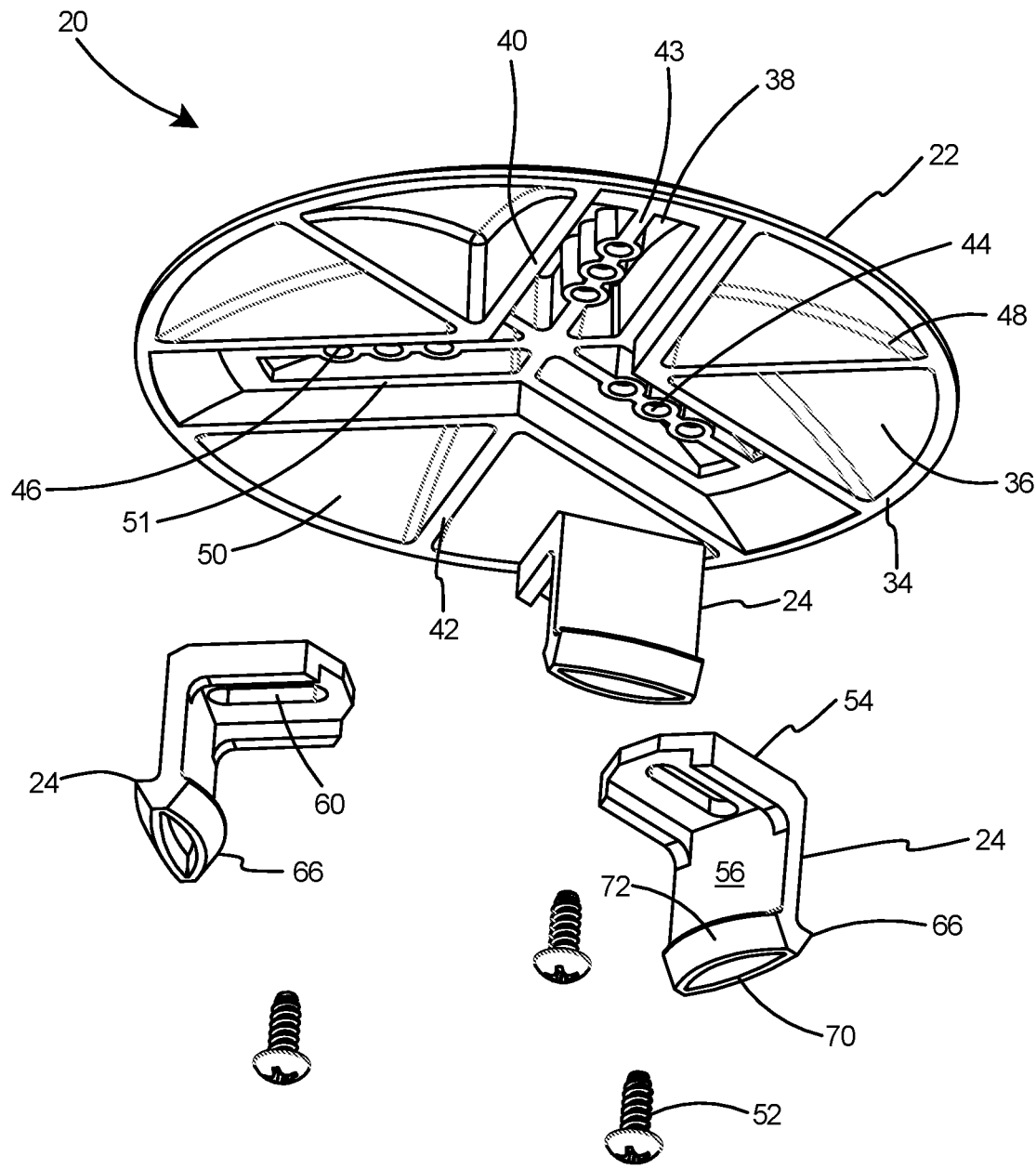
FIG. 5 is an exploded perspective view of the adjustable hole cover with the retaining clips broken away from the cover plate.

With reference to FIG. 5, the substantially convex bottom surface 36 of the cover plate 22 includes one or more channels 38 with each channel defined by a pair of parallel ribs 40. The bottom surface 42 of each rib 40 is substantially planar with the outer circumference 34. A support bar 43 bisects each channel 38 and one or more bosses 44 are centered on each support bar. A bore 46 is provided in each boss 44. A bracing rib 48 is provided outside the channels 38 midway between adjacent parallel ribs 40. Material-saving recesses 50 are provided on the underside of the cover outside the channels 38 midway between adjacent parallel ribs 40. Each bore 46 is preferably in axial alignment with a corresponding aperture 28 in the top surface 32 of the cover plate 22. Within each channel 38 there is provided a rail 51 on each of the parallel ribs 40. The rails 51 each include a planar surface. A retaining clip 24 may be fitted into any channel 38 and can be slid to any desired location in the channel 38. The retaining clip 24 may be secured in a selected boss 44 in each channel 38 in order to accommodate a hole (not shown) in an existing floor or similar structure. The retaining clips 24 may be secured with fasteners 52 as shown.

Referring to FIGS. 6-10 each retaining clip 24 is substantially L-shaped with a base leg 54 and a second leg 56 at a substantially right angle with respect to one another. The base leg 54 includes an elongated slot 60 for facilitating attachment to the cover plate 22 by a fastener (see FIG. 5). The base leg 54 includes a width W1 slightly less than the width of each channel 38 on the cover plate 22. The retaining clip 24 further includes two wings 62 on the base leg 54 and a wide end portion 64 on the second leg 56. The wide end portion 64 terminates in a double barb 66, with a sharpened barb extending in two directions from the second leg 56. The wide end portion 64 includes a recess 68, an arcuate outer surface 70 and an arcuate inner surface 72. The base leg 54 includes an outer end 74.

Figure 11:
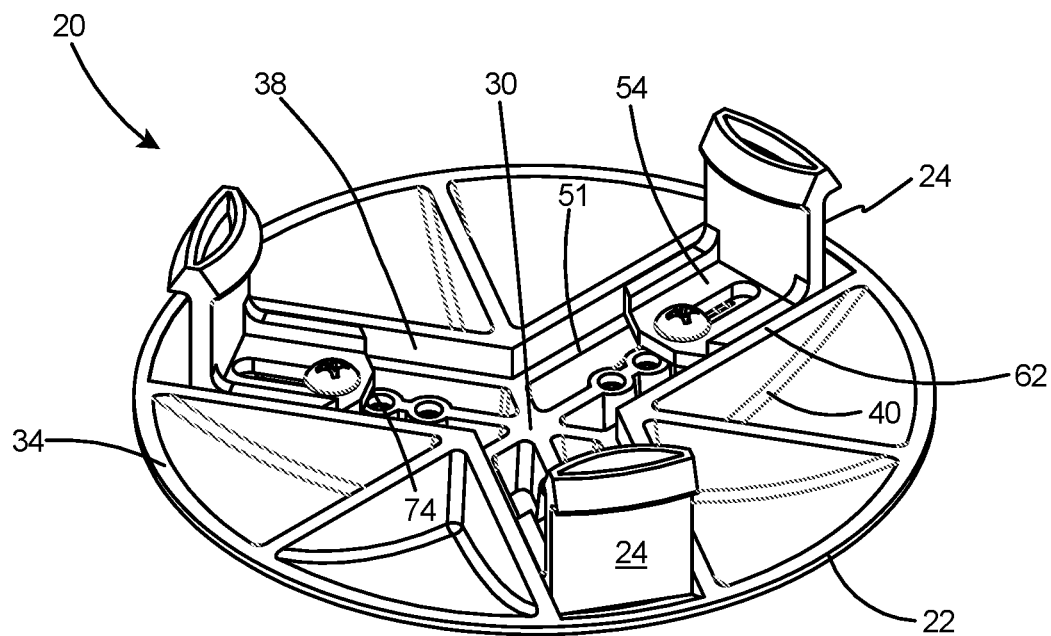
FIG. 11 is a bottom perspective view of the adjustable hole cover in a maximum hole configuration.
Figure 12:
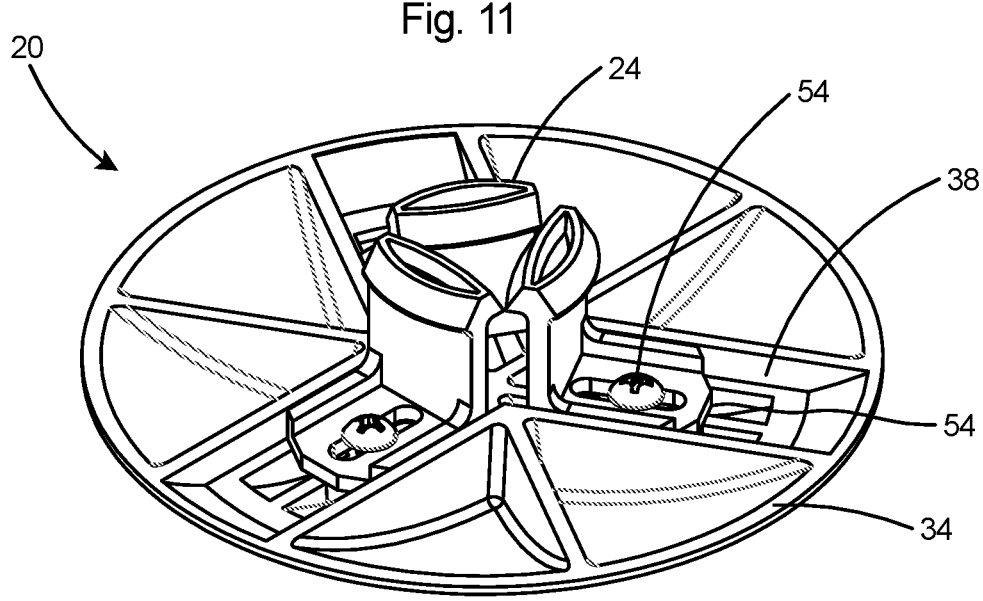
FIG. 12 is a bottom perspective view of the adjustable hole cover in a minimum hole configuration.

With reference to FIGS. 11 and 12, the adjustable hole cover 20 can be set to various configurations to fit a plurality of floor hole diameters. The diameter of the adjustable hole cover involves orienting the retaining clips 24 in the desired direction and securing the retaining clips 24 in a specific aperture to fit the floor hole. As an example, FIG. 11 depicts the adjustable hole cover 20 set to a maximum hole configuration. The outer end of the base leg 54 on each retaining clip 24 is oriented toward the center 30 of the cover plate 22, the retaining clips 24 are slid within each channel 38 to the desired position, and the retaining clips then secured into the outermost boss 44 in each channel 38. The base leg 54 of each retaining clip 24 resides in a corresponding channel 38 with the top of the wings 62 flush with the pair of parallel ribs 40.

Alternatively, as shown in FIG. 12, the retaining clips 24 can be positioned in the channels 38 with the outer end of the base leg 54 oriented outward or toward the outer circumference 34 of the cover plate 22. FIG. 12 depicts the adjustable hole cover 20 set to a minimum hole configuration, with the retaining clips 24 secured into the innermost boss 44 in each channel 38. Thus, operation of the invention involves setting the orientation of the retaining clips 24 within the channels 38 and selecting a specific boss 44 in each channel 38 in order to meet a specific floor hole application.

Figure 13:
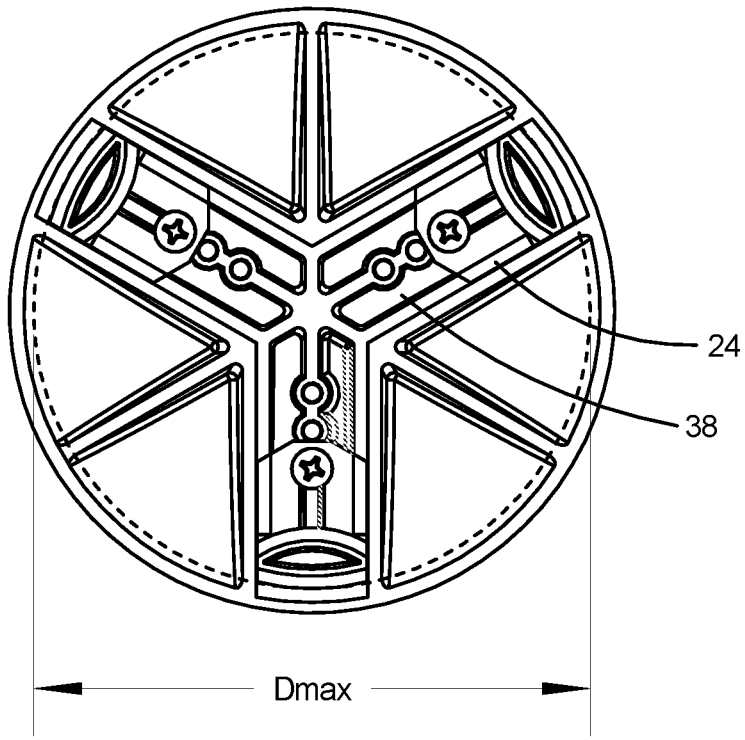
FIG. 13 is a bottom plan view of the adjustable hole cover in a maximum hole configuration.
Figure 14:
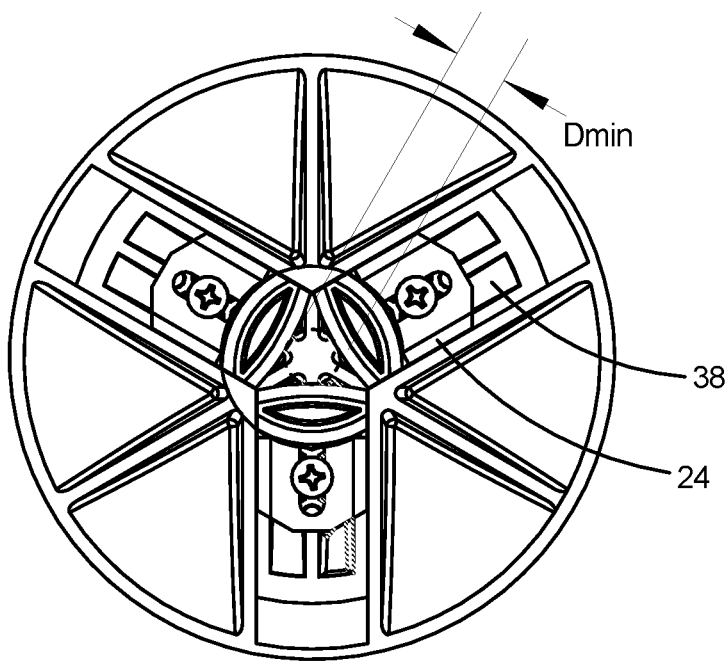
FIG. 14 is a bottom plan view of the adjustable hole cover in a minimum hole configuration.

FIG. 13 depicts the adjustable hole cover 20 set to a maximum hole configuration, with the broken line indicating the diameter of the floor hole. FIG. 14 depicts the adjustable hole cover 20 set to a minimum hole configuration, although various additional floor holes may be covered by varying the retaining clip 24 orientation and the selected boss 44.

As shown in FIG. 5, the fasteners 52 are secured to the bottom of the cover plate 22 which places them underneath the cover plate 22 when secured to a hole, thereby preventing their projection above the cover plate and eliminating them as a tripping hazard to foot traffic. The double barbed 66 end portion 64 bites into the side wall of the floor hole and holds the cover plate 22 securely to the floor.

Figure 15:
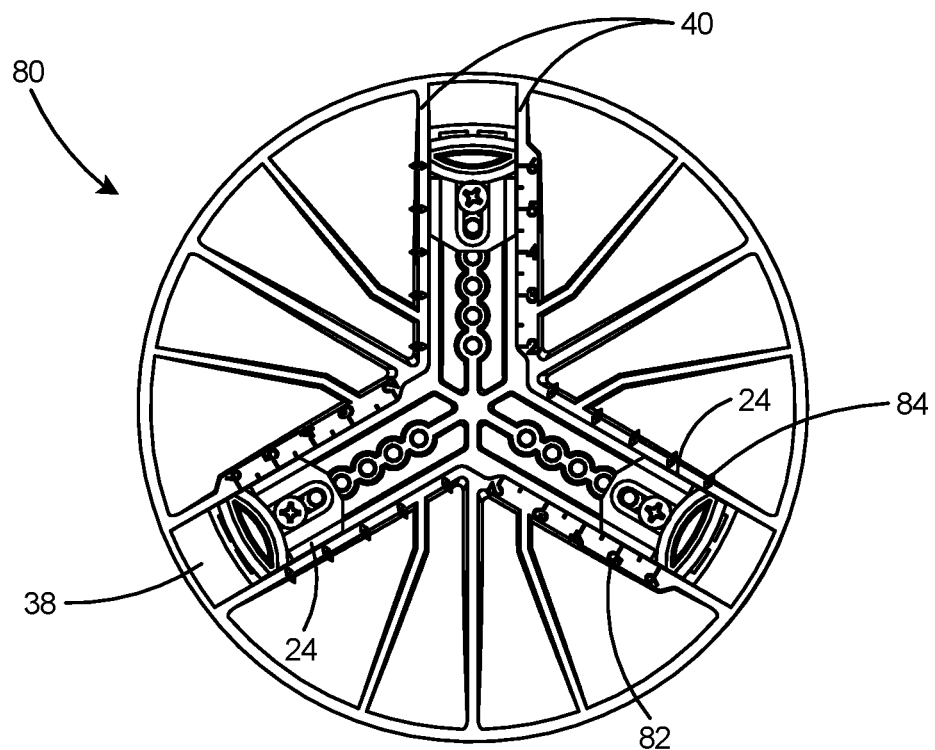
FIG. 15 is a bottom plan view of a second embodiment of the adjustable hole cover in a maximum hole configuration.
Figure 16:
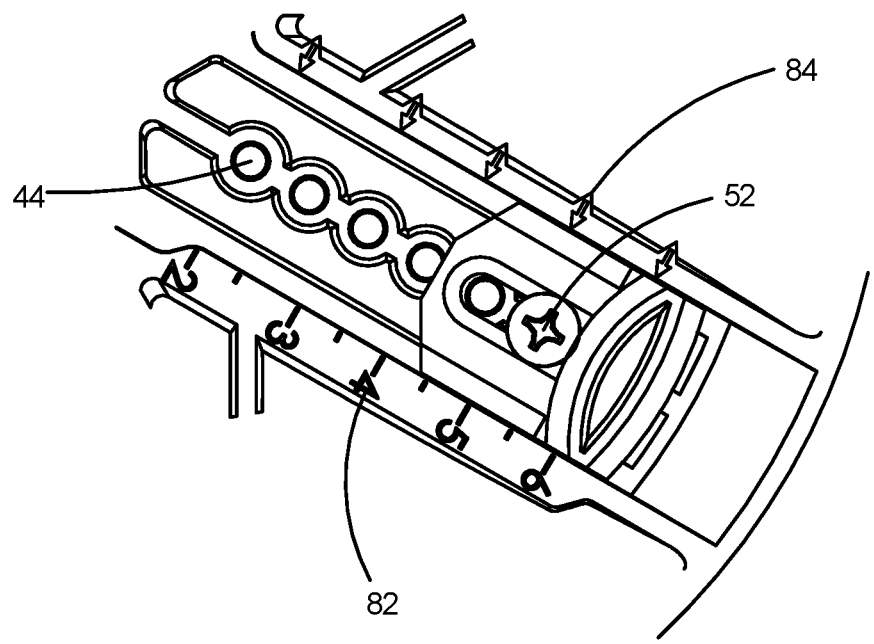
FIG. 16 is a detail view of one channel of the adjustable hole cover of FIG. 15 depicting the reference scale on the underside of the cover that allows for precise sizing to fit the hole diameter.

With reference to FIGS. 15-16, a second embodiment of the adjustable hole cover 80 in a maximum hole configuration. Adjustable hole cover 80 includes a reference scale 82 on one of the parallel ribs 40 defining each channel 38 and a reference indicator 84 on the opposing rib. The retaining clips 24 are aligned at the 6-inch gradation on the reference scale 82 to fit a 6-inch diameter hole.

Figure 17:
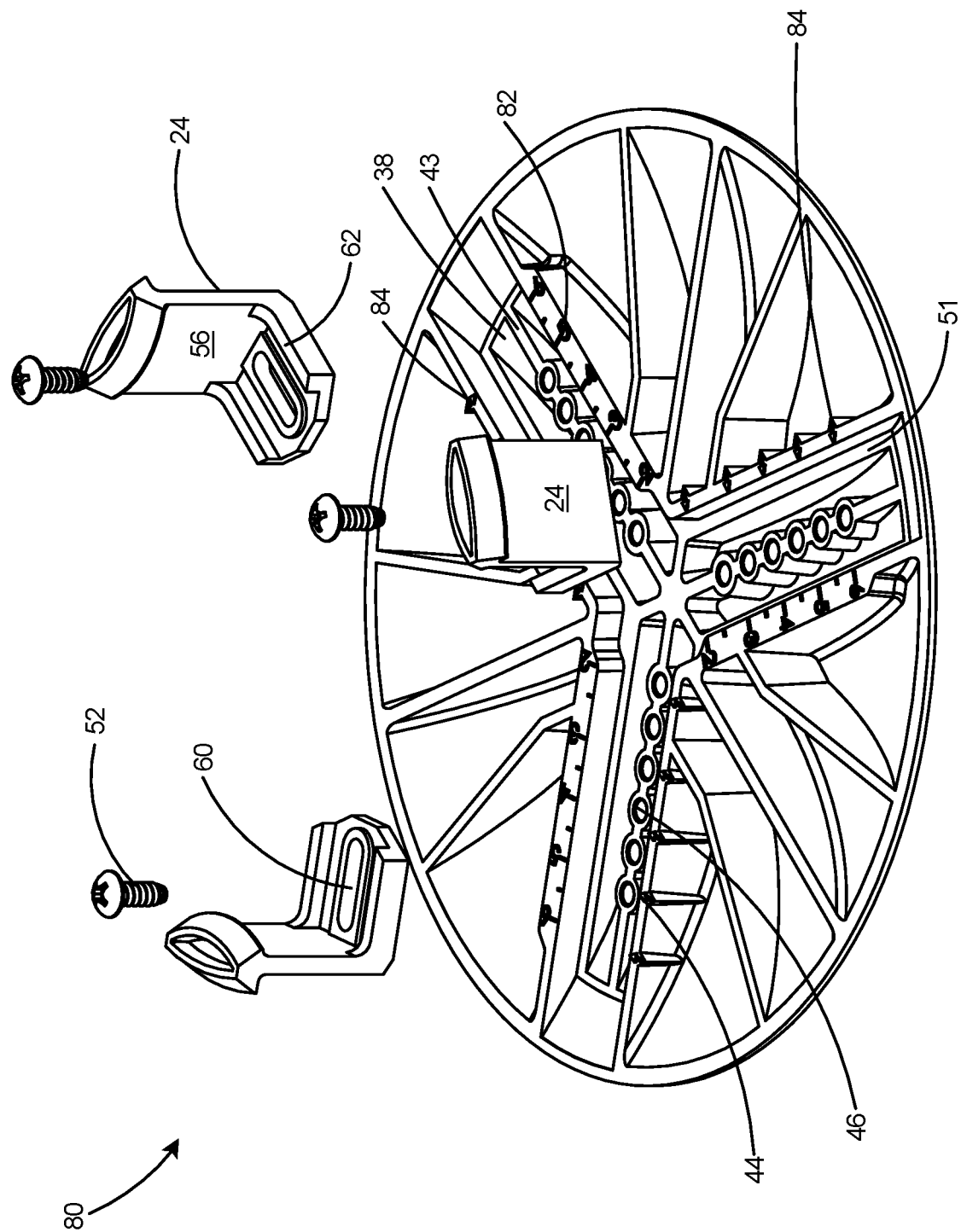
FIG. 17 is a perspective view of the underside of the adjustable hole cover of FIG. 15.

Referring to FIG. 17, the retaining clips 24 can be secured to the cover plate by driving fasteners 52 through the slots 60 in the retaining clips 24 and into any selected boss 44. An installer, using the reference scale 82 and reference indicator 84 on the parallel ribs 40, can rapidly secure the retaining clips 24 at the proper location and in the proper orientation and secure it to the appropriate boss 44 to fit a specific hole size.

Operating the invention involves first measuring the hole to be covered. Using the size reference scale, attach the retaining clips to the underside of the cover with the supplied screws. For small holes, position the longer leg of the retaining clips toward the outside edge of the cover. The assembled hole cover is then pushed into the hole and, if necessary, one of the retaining clips can be adjusted to provide a snug fit in the hole. If the fit is too loose, one of the clips can be moved slightly outward. If it is desired to remove the hole cover after installation, it may be simply removed with a flat blade screwdriver.

The adjustable hole cover of the present invention may be constructed of metal or plastic. Most preferably the adjustable hole cover is molded in one piece of plastic and the plastic material of construction is preferably nylon, polycarbonate, or polyvinyl chloride.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An adjustable hole cover comprising:
a cover plate including a center, a top surface having an outer edge, an underside, and an outer circumference, said top surface being substantially arcuate in shape and a juncture of said top surface and said outer edge defines a substantially right angle;
one or more channels, each said channel defined by a pair of parallel ribs, extending outward radially on said underside of said cover plate;
one or more bosses located in said one or more channels;
a removable L-shaped retaining clip positioned in each of said channels;
each said L-shaped retaining clip having a base leg which is substantially parallel to said underside of said cover plate and a second leg which extends substantially orthogonally from said base leg away from said underside of said cover plate; and
a fastener extending from said underside of said cover plate through each of said retaining clips and into a respective boss of said one or more bosses.

2. The adjustable hole cover of claim 1, comprising a bore in each of said bosses.

3. The adjustable hole cover of claim 1, comprising:
one or more rows of apertures in said cover plate; and
each of said rows of apertures in axial alignment with a corresponding channel of said cover plate.

4. The adjustable hole cover of claim 1, comprising a slot in said base leg.

5. The adjustable hole cover of claim 1, comprising a reference scale on the underside of the cover plate.

6. The adjustable hole cover of claim 5, comprising a reference indicator on the underside of the cover plate.

7. The adjustable hole cover of claim 6, comprising:
said reference scale is on a first of said parallel ribs; and
said reference indicator is on a second of said parallel ribs.

8. The adjustable hole cover of claim 7, comprising said reference scale including numerals providing a guide to attachment of said retaining clips to fit a specific hole diameter.

9. The adjustable hole cover of claim 1 wherein said second leg is planar and includes an interior side facing the center of the hole cover and an exterior side which faces away from the center and towards the outer circumference of the top side;
an outside barb which is positioned on said exterior side of said second leg; and
said outside barb extending across the entire width of the second leg.

10. The adjustable hole cover of claim 9 further comprising a double barb consisting of said outside barb and further including an inside barb which is positioned on the interior side of the second leg.

11. The adjustable hole cover of claim 10 wherein said outside barb and inside barb are arcuate.

12. The adjustable hole cover of claim 11 further comprising a recess at one end of said second leg proximate to and between said inside barb and said outside barb.

* * * * *